United States Patent [19]
Felten

[11] Patent Number: 5,338,708
[45] Date of Patent: Aug. 16, 1994

[54] PALLADIUM THICK FILM COMPOSITIONS

[75] Inventor: John J. Felten, Chapel Hill, N.C.

[73] Assignee: E. I. du Pont de Nemours and Company, Wilmington, Del.

[21] Appl. No.: 170,103

[22] Filed: Dec. 20, 1993

[51] Int. Cl.$^5$ .............................................. C03C 8/18
[52] U.S. Cl. ...................................... 501/19; 501/20; 252/514; 252/518; 106/1.21; 106/1.28
[58] Field of Search .............................. 501/19, 20, 23; 106/1.21, 1.28; 252/514, 518

[56] References Cited

U.S. PATENT DOCUMENTS

| | | | |
|---|---|---|---|
| 3,537,892 | 11/1966 | Milkovich et al. | 106/1.21 |
| 4,150,995 | 4/1979 | Moritsu et al. | 106/1.21 |
| 4,172,733 | 10/1979 | Moritsu et al. | 106/1.21 |
| 4,394,171 | 7/1983 | Nair | 106/1.21 |
| 4,476,090 | 10/1984 | Heidsier et al. | 501/19 |
| 5,221,644 | 6/1993 | Berlin et al. | 252/514 |

FOREIGN PATENT DOCUMENTS 3446919  7/1985  Fed. Rep. of Germany ........ 501/19

Primary Examiner—Mark L. Bell
Assistant Examiner—Deborah Jones

[57] ABSTRACT

A thick composition comprising a mixture of: (a) 30–80% wt. finely divided particles of palladium powder having a surface area of 3–10 square meters/gm and density of 0.5–0.7 grams/cc; (b) 2–10% wt. finely divided particles of a refractory inorganic binder; all of A and B being dispersed in (c) 68–10% wt. of an organic medium; wherein the firing temperature of the composition is from 800°–950° C. This thick film composition is useful for forming detector electrodes within hydrogen sensors.

5 Claims, 1 Drawing Sheet

PALLADIUM THICK FILM COMPOSITIONS

FIELD OF THE INVENTION

This invention is directed to palladium thick film compositions and particularly to palladium thick film compositions which are compatible for use with sensors for monitoring hydrogen concentrations in gases.

BACKGROUND OF THE INVENTION

Hydrogen sensors are well known in the industry. The current sensors have very long response times and have high cross-sensitivity for other gases due to the use of detector electrodes comprised of semiconductor oxides.

A growing need in the industry is the ability to manufacture fast-acting, accurate hydrogen sensors to detect hydrogen gas with the lowest possible cross-sensitivity for other gases. Accordingly, the need exists for a conductor composition with the greatest hydrogen permeability.

The solubility of hydrogen in palladium has been well known to scientists. Its use as a probe for measuring hydrogen content, however, is a recent adaptation. Previous attempts to prepare hydrogen sensors using palladium deposited by thin film techniques proved less than satisfactory due to the film being extremely thin, causing high resistivity and the film being nonporous causing relatively slow hydrogen diffusion through the film, resulting in slow response time.

Palladium thick film compositions have typically been used as capacitor electrodes but not for detector electrode applications. In order to maximize conductivity of the compositions in an extremely thin metallization application, pure palladium conductors are typically fired over 1100° C. This firing range is not desirable for producing detector electrodes, therefor, those skilled in the art have thought it to be necessary to add silver to the thick film compositions. The addition of silver causes the Pd/Ag metallization to have low porosity resulting in slow hydrogen diffusion and reduced hydrogen solubility. The present invention answers this need by offering a palladium thick film conductor composition suitable for use in a hydrogen sensor.

SUMMARY OF THE INVENTION

A thick film conductor composition comprising a mixture of:
(a) 30–80% wt. finely divided particles of palladium powder having a surface area of 3–10 square meters/gm and density of 0.5–0.7 grams/cc;
(b) 2–10% wt. finely divided particles of a glassy inorganic binder;
all of (a) and (b) being dispersed in (c) 68–10% wt. of an organic medium;
wherein the firing temperature of the composition is from 800°–950° C.

DEFINITIONS

As used herein the following terms have the indicated meanings:

The term "glassy" means a composition formulated to be a non-crystalline glass composition.

The term "dendritic" means branching tree-like structure.

DETAILED DESCRIPTION

The present invention meets the following criteria for the formulation of a thick film composition suitable for hydrogen sensor application.

The composition fires out porous to allow rapid hydrogen penetration of the film.

The composition uses a glassy binder to maintain high adhesion after firing from 800°–950° C. Firing below 800° C. causes formation of PdO. PdO formation is a problem causing high porosity in the fired state. Firing above 950° C. causes reduced hydrogen porosity which affects response time.

The binder of the present invention is hydrolysis resistant, since it will endure hot water and steam in its end use environment.

The principle of operation of the sensor is that hydrogen reacts chemically with a sensor electrode by dissolving in palladium metal. This changes the electrical resistance of the metal. The electrical resistivity or changes in resistivity, at the sensor electrode, can be evaluated and further processed by a subsequently connected electronic system. The present invention, thus utilizes the fact that the hydrogen contained in the gas being monitored by the palladium thick film composition dissolves in the sensor electrode and, thus, changes the resistance of the sensor which produces the sensor signal. A palladium meander pattern rendered by the present invention provides a large surface for the hydrogen to diffuse into, and the change in resistivity is measured through a Wheatstone bride printed onto the substrate. The largest potential change in resistivity would, therefore, be with a Pd composition.

The present invention gives maximum hydrogen solubility through use of substantially unalloyed palladium powder by producing the greatest resistance change ($\Delta R$) upon hydrogen diffusion. The palladium powder produces the highest probability of optimum performance in contrast to a Pd/Ag composition as used in the art.

A. PALLADIUM POWDER

Figure 1:
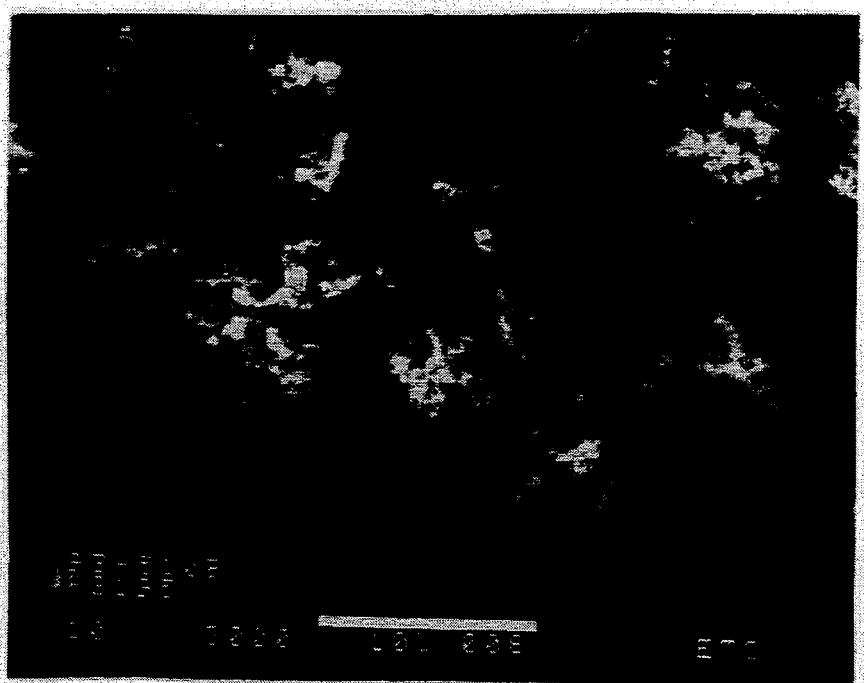
FIGS. 1 and 1A are SEM photographs at magnification of 3000 and 6000 respectively of Pd powder that depicts the powder as a dendritic, rod-like particle composed of spokes coming off the rods. Individual agglomerated particles measure about 10 microns in length.
Figure 1A:
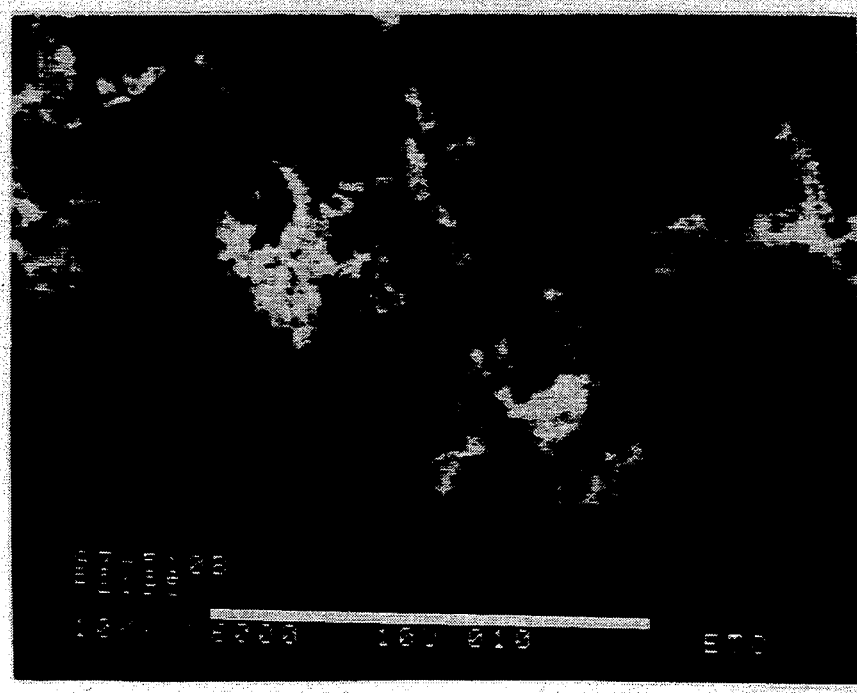

The palladium powder suitable for use in the invention is selected according to particle size. The particles are predominately rod-shaped and measure 1–2 microns but as shown in FIGS. 1 and 1A, the powder is agglomerated until it is combined in the paste where it is roll milled. The roll milling results in finely divided Pd powder which will sinter at 800° C.

The present invention contains a range by weight of 30%–80% palladium powder. It has been found that if less than 30% is used, the composition will not exhibit a change in resistance which produces a sensor signal. On the other hand, if more than 80% is used, unsatisfactory paste theology occurs whereby the film becomes too thick for sensor application purposes. It is preferred that the palladium powder be present within the range of 40–60%.

A preferred palladium powder is P-2195 available from E. I. du Pont de Nemours and Co., Wilmington, Del.

B. BINDER

Glasses suitable for use in the invention need to be chemically resistant, with a high Tg to withstand a high 950° firing temperature without excessive bleedout. However, the Tg needs to be low enough that it will sinter and flow at firing temperatures in the range of 800°-950° C. and which will wet the substrate and Pd conductor at those temperatures.

The preparation of such glass frits is well known and consists, for example, in melting together the constituents of the glass in the form of the oxides or carbonates of the constituents and pouring such molten composition into water to form the frit. The batch ingredients may, of course, be any compound that will yield the desired oxides under the usual conditions of frit production. A preferred binder is the composition listed in the Example, available from E. I. du Pont de Nemours and Co., Wilmington, Del.

C. ORGANIC MEDIUM

Organic medium suitable for use in the invention are selected according to the physical form in which the thick film composition is applied. The main purpose of the organic medium is to serve as a vehicle for dispersion of the finely divided solids of the composition in such a form that it can readily be applied to the detector electrodes. Thus, the organic medium must first of all be one in which the solids are dispersible with an adequate degree of stability. Secondly, the rheological properties of the organic medium must be such that they lend good application properties to the dispersion. Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling and good firing properties. Satisfactory appearance of the fired composition is also important.

In view of all these criteria, a wide variety of liquids can be used as organic medium. The organic medium for most thick film compositions is typically a solution of resin in a solvent frequently also containing thixotropic agents and wetting agents. The solvents usually boil within the range of 130° C.–350° C.

Suitable solvents include kerosene, mineral spirits, dibutylphthalate, butyl carbitol, butyl carbitol acetate, hexylene glycol and high boiling alcohols and alcohol esters. Various combinations of these and other solvents are formulated to obtain the desired viscosity and volatility.

By far the most frequently used and a frequently preferred resin for this purpose is ethyl cellulose. However, resins such as ethylhydroxyethyl cellulose, wood rosin, mixtures of ethyl cellulose and phenolic resins, polymethacrylates of lower alcohols and monobutyl ether of ethylene glycol monoacetate can also be used.

Among the thixotropic agents which are commonly used are hydrogenated castor oil and derivatives thereof and ethyl cellulose. It is, of course, not always necessary to incorporate a thixotropic agent since the solvent resin properties coupled with the shear thinning, inherent in any suspension, may alone be suitable in this regard. Suitable wetting agents include phosphate esters and soya lecithin.

A preferred medium is a mixture of ethyl cellulose, dibutyl phthalate, terpineol isomers. The composition needs to be chemically resistant to withstand the environment of the interior of a nuclear reactor.

EXAMPLES

The surface area of a powder is between 3 and 10 square meters/gm of powder.

The Pd is about 0.5 to 0.7 grams/cc powder, in contrast with the bulk density of palladium, which is 11.97. The powder structure is dendritic with a preponderance of void space in the powder, as shown in FIG. 1A. The dendritic rods have a diameter of about 0.1 micron.

A vehicle is a solution of ethyl cellulose in a mixture of terpineol and dibutyl phthalate. The vehicle is prepared by stirring in the ethyl cellulose typically into room temperature solvent, then heating to 80° to 110° until the ethyl cellulose is dissolved. The material was held at 80° until preliminary quality measurements have been completed so that any dilution or addition of extra resin can be accomplished expediently.

A glass is prepared by placing the components in a platinum lined ceramic crucible, and heating to 1400° to 1600° C., then quenching in water and grinding in an impact mill in a manner familiar to one skilled in the art of glass powder preparation. The softening point of the glass is 505° C. as measured on a dilatometer. Its thermal coefficient of expansion is 8.5 ppm, and its transition point is 450, as measured on a dilatometer.

A thick film paste is prepared by combining the Pd powder, the glass, and the vehicle together, mixing thoroughly, then roll milling in a manner familiar to one skilled in the art of thick film ink formulation.

The formulation is offered in Table 1 herein below.

TABLE 1

| Thick Film Composition | |
|---|---|
| Pd Powder | 50% |
| Glass Powder | 4% |
| Organic Medium | 46% |
| Glass Powder | |
| PbO | 47.7% |
| $B_2O_3$ | 3.0% |
| $SiO_2$ | 33.8% |
| $TiO_2$ | 5.4% |
| $ZrO_2$ | 3.0% |
| ZnO | 0.6% |
| $Na_2O$ | 3.2% |
| CdO | 2.4% |
| $Li_2O$ | 0.9% |
| Organic Medium | |
| Ethyl Cellulose | 13% |
| Dibutyl Phthalate | 44% |
| Terpineol Isomers | 43% |

The ethyl cellulose was grade T-50 from Hercules, Inc., Wilmington, Del.

Parts were produced by screen printing the composition of Table 1 on a substrate. The parts were printed using typical screen printing parameters. The screen was a 200 mesh screen with a 1.6 mil stainless serpentine line pattern printed onto a 1 inch square substrate of 96% alumina. The parts were dried 15 minutes at 100°-150° C., then fired in a tunnel kiln for ten minutes at a peak temperature of 850°-950° C., wherein the solids are sintered to form a non-void free solid mass.

Testing

The parts were tested for resistance on a 200 square serpentine pattern, printed with a 325 mesh screen. Parts were fired on a 30 or 60 minute typical thick film tunnel kiln profile at 850° and 950° C. peak with 10 minutes dwell time at peak temperature at 80 to 183 ohm's. Results are as follows:

| Resistance of 200 Square Serpentine Pattern | | | |
| --- | --- | --- | --- |
|  | 850° 30 min | 850° 60 min | 950° 60 min |
| Initial | 90.7Ω | 182.5Ω | 80.1Ω |
|  | 114.0Ω | 169.0Ω | 79.8Ω |
| After 16 hrs. | 92.2Ω | 184.7Ω | 80.0Ω |

The viscosity is measured on a Brookfield HBT, utility cup and #14 spindle at 250° C. The viscosity target is between about 150 Pa.S and 250 Pa.S to ensure a reasonable printing speed and print thickness.

Viscosity: 230 Pa.s (HBT, UC+S, 10 RPM, 25.0°)

What is claimed is:

1. A thick film conductor composition consisting essentially of a mixture of:
   (a) 30–80% wt. finely divided particles of palladium powder having a surface area of 3–10 square meters/gm and density of 0.5-0.7 grams/cc;
   (b) 2–10% wt. finely divided particles of a refractory inorganic binder;
   all of (a) and (b) being dispersed in (c) 68-10% wt. of an organic medium;
   wherein the firing temperature of the composition is from 800°-950° C.

2. The composition of claim 1 wherein the glassy refractory inorganic binder (b) comprises on a weight basis, 47.7% PbO, 3.0% B203, 33.8% $SiO_2$, 5.4% $TiO_2$, 3.0% $ZrO_2$, 0.6% ZnO, 3.2% $Na_2O$, 2.4% CdO, 0.9% $Li_2O$.

3. The composition of claim 1 wherein the organic medium comprises on a weight basis, 13% ethyl cellulose, 44% dibutyl phthalate, 43% terpineol isomer.

4. The composition of claim 1 wherein the palladium powder comprises dendritic palladium particles within the range of 1-2 microns.

5. The composition of claim 1 wherein the firing temperature of the composition is from 850°-950° C.

* * * * *

UNITED STATES PATENT AND TRADEMARK OFFICE
CERTIFICATE OF CORRECTION

PATENT NO. : 5,338,708
DATED : August 16, 1994
INVENTOR(S) : John James Felten

It is certified that error appears in the above—identified patent and that said Letters Patent is hereby corrected as shown below:

Column 6,

Line 6, after "particles of a" insert --glassy--;
  Line 14, replace "B203" with --$B_2O_3$--.

Signed and Sealed this

Eighteenth Day of October, 1994

Attest:

BRUCE LEHMAN

*Attesting Officer*          *Commissioner of Patents and Trademarks*